United States Patent
Cox (10) Patent No.: US 10,265,783 B2
(45) Date of Patent: Apr. 23, 2019

(54) UNIVERSAL CLAMPING ASSEMBLY FOR KEY DUPLICATING MACHINE

(71) Applicant: KABA ILCO CORP., Rocky Mount, NC (US)

(72) Inventor: Herman Cox, Pinetops, NC (US)

(73) Assignee: KABA ILCO CORP., Rocky Mount, NC (US)

( * ) Notice: Subject to any disclaimer, the term of this patent is extended or adjusted under 35 U.S.C. 154(b) by 244 days.

(21) Appl. No.: 15/412,960

(22) Filed: Jan. 23, 2017

(65) Prior Publication Data

US 2017/0129024 A1  May 11, 2017

Related U.S. Application Data

(62) Division of application No. 14/516,134, filed on Oct. 16, 2014, now Pat. No. 9,586,273.

(60) Provisional application No. 61/891,726, filed on Oct. 16, 2013.

(51) Int. Cl.
B23C 3/35 (2006.01)

(52) U.S. Cl.
CPC ......... B23C 3/355 (2013.01); Y10T 29/49998 (2015.01); Y10T 409/300952 (2015.01); Y10T 409/303752 (2015.01); Y10T 409/309016 (2015.01)

(58) Field of Classification Search
CPC . Y10T 409/300952; Y10T 409/301008; Y10T 409/301064; Y10T 409/303752; Y10T 409/309016; B23Q 3/183; B23Q 3/186; B23C 3/35; B23C 3/355

USPC ............... 409/81, 82, 83, 131, 225
See application file for complete search history.

(56) References Cited

U.S. PATENT DOCUMENTS

| | | | | |
|---|---|---|---|---|
| 2,148,667 | A * | 2/1939 | Yoskowitz | G07F 11/50 221/122 |
| 3,138,999 | A * | 6/1964 | Haggstrom | B23C 3/35 409/83 |
| 3,172,969 | A * | 3/1965 | Haggstrom | E05B 17/0016 200/61.59 |
| 3,245,149 | A * | 4/1966 | Haggstrom | B23C 3/35 33/539 |
| 3,257,908 | A * | 6/1966 | Haggstrom | B23C 3/35 269/235 |
| 4,614,465 | A | 9/1986 | Wu | |

(Continued)

*Primary Examiner* — Erica E Cadugan
*Assistant Examiner* — Michael Vitale
(74) *Attorney, Agent, or Firm* — Norton Rose Fulbright US LLP (57) ABSTRACT

A universal clamping assembly for a key duplicating machine is described. The clamping assembly comprises a housing having a pair of opposed flat guide rail support surfaces and a sliding tip clamp is guidingly displaceable along each of the guide rail support surfaces and are urged against the tip of the key and key blank blades which are positioned on the guide rails. A pivoting clamp is displaceably engageable on a forward top edge of the respective key blades to apply a downward force on the key blades to ensure that the lower edge of the key blades is firmly resting against the guide rail support surfaces. A pair of cam operated side clamps is actuable to further clamp the blade on their sides at two distinct areas. The universal clamping assembly is capable of accommodating different key and key blank lengths, widths and thicknesses. The method of clamping the key and key blank is also described.

3 Claims, 11 Drawing Sheets

(56) References Cited

U.S. PATENT DOCUMENTS

| | | | |
|---|---|---|---|
| 5,360,299 A | 11/1994 | Oliana | |
| 5,496,138 A | 3/1996 | Drori | |
| 5,660,509 A | 8/1997 | Cole et al. | |
| 5,794,925 A | 8/1998 | Fantl et al. | |
| 5,906,365 A | 5/1999 | Wu | |
| 6,602,030 B1 | 8/2003 | Markbreit | |
| 6,641,339 B2 | 11/2003 | Chies et al. | |
| 7,163,364 B2 | 1/2007 | Foscan et al. | |
| 7,300,235 B2 | 11/2007 | Gimelfarb et al. | |
| 7,918,629 B2 | 4/2011 | Belflower et al. | |
| 8,142,117 B2 | 3/2012 | Belflower et al. | |
| 8,287,215 B2 * | 10/2012 | Freeman | B23C 3/35 409/81 |
| 2005/0120530 A1 | 6/2005 | Persson | |
| 2015/0101178 A1 | 4/2015 | Cox | |

\* cited by examiner

UNIVERSAL CLAMPING ASSEMBLY FOR KEY DUPLICATING MACHINE

CROSS-REFERENCE TO RELATED APPLICATIONS

The present application is a divisional of co-pending U.S. patent application Ser. No. 14/516,134 entitled "UNIVERSAL CLAMPING ASSEMBLY FOR KEY DUPLICATING MACHINE," filed Oct. 16, 2014 which itself claims priority to U.S. Provisional Application No. 61/891,726, filed on Oct. 16, 2013, the entire contents of which are incorporated herein by reference.

TECHNICAL FIELD

The present application relates to a universal clamping assembly for a key duplicating machine and its method of operation.

BACKGROUND OF THE ART

Key duplicating machines for biting a key blank to duplicate a key is well-known in the art. An example of such machines is described in U.S. Pat. No. 1,842,117. That patent discloses utilizing projecting clamp pins and key head wall configurations for properly positioning the key and the jaw clamp. It also discloses methods of aligning keys in key cutting machines.

There is a need to provide a clamping device or assembly which is simple to load without extensive training or the user person or the use of charts to look up and to accurately cut two types of common keys, namely household and automotive keys. These keys are of the shoulder stop key type and the tip-shoulder double-sided key types. There is also a need to provide a clamping device or assembly for each of these two types of keys and key blanks which would accommodate the shortest to the longest keys, and the thinnest and the thickest of these. The device or assembly would need to be able to compensate for these variations without additional operator input. The key cutting process has to be as simple as possible and the device has to provide improved clamping and positioning of the key and key blank.

SUMMARY

It is an aim of the present invention to provide a universal clamping assembly for a key duplicating machine and which addresses the above-required needs.

Another feature of the present invention is to provide a method of clamping a key and a key blank in a key duplicating machine and which provides at least some of the above-mentioned needs.

According to a broad aspect of the present invention, there is provided a universal clamping assembly for a key duplicating machine. The clamping assembly comprises a housing having a pair of opposed flat guide rail support surfaces. A sliding tip clamp is guidingly displaceable along at least a portion of each of the guide rail support surfaces by biasing means to bias a key tip clamping wall of the sliding tip clamp against a lower angulated end portion of a single or double-sided key and key blank disposed with a bottom edge of a key blade thereof supported on a respective one of the guide rail support surfaces. A pivoting clamp is displaceably engageable on a forward top edge of a respective one of the key blades to apply a downward force on the key blades to force the bottom edge thereof against the opposed guide rail support surface. A pair of cam operated side clamping means is provided to immovably and transversally clamp the key blades. The clamping assembly accommodates different key and key blank lengths, widths and thicknesses.

According to a further broad aspect, there is provided a method of clamping a key and a key blank in a key duplicating machine. The method comprises the steps of inserting a blade of a key to be duplicated and a blade of a key blank onto a respective one of two opposed flat guide rail support surfaces of the machine through a key orifice by lifting a pivoting spring biased clamp and pushing a tip of the key blade and the tip of the blade of the key blank against a spring force of a respective sliding tip clamp guidingly displaceable along at least a portion of the guide rail support surface. The method also comprises releasing the spring biased clamp to engage and apply a downward spring force on a forward top edge of a respective one of key blades of the key and key blank to force a bottom edge of the blades against its respective guide rail support surface. A cam element is then operated to displace a pair of side clamping members for immovably and transversally clamping the key blades at least two spaced-apart locations.

DETAILED DESCRIPTION OF THE PREFERRED EMBODIMENTS

Figure 1:
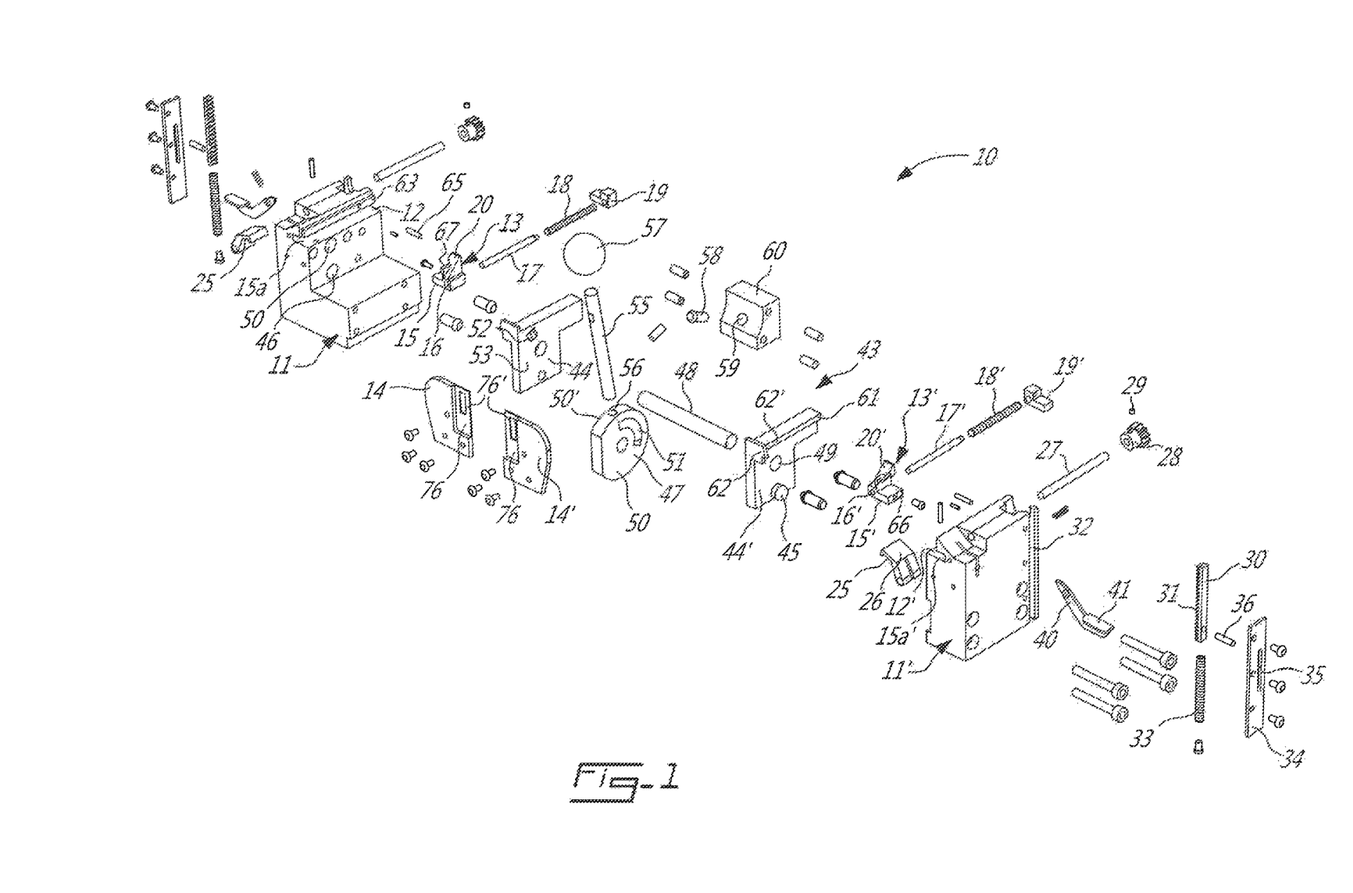
FIG. 1 is an exploded view of a universal clamping assembly for use in a key duplicating machine for a shoulder-stop key.

Referring to the drawings and more specifically to FIG. 1, there is shown an exploded view of a universal clamping assembly 10 for use in a key duplicating machine, not illustrated in this figure but obvious to a person skilled in the art. The universal clamping assembly 10 is comprised of a housing herein fabricated in two parts, namely a housing block 11 and a housing cover 11' securable thereto and to which is attached the different clamping mechanisms, as will be described herein. The housing block 11 defines a flat guide rail support surface 12 for receiving a key blade to be duplicated. Likewise, the housing cover 11' also has a flat guide rail support surface 12' for receiving a blade of a key blank to be bitted. The surfaces 12, 12' as herein shown are disposed in a common plane when the housing block 11 and housing cover 11' are assembled together and this depends on the disposition of the key blade stylus and cutter, as will be seen herein after.

With additional references now to FIGS. 2 to 4B, there is shown that each of the guide rail support surfaces has a sliding tip clamp 13 and 13' which is held captive for sliding displacement along at least a portion of the guide rail support surfaces 12 and 12', respectively. The sliding tip clamps are also biased or spring loaded forwardly in the direction of the window plates 14 and 14' of the universal clamping assembly 10.

As more clearly shown in FIG. 1, the sliding tip clamps 13 and 13' have a base 15 and 15' respectively, which is slidingly retained captive in a side channel 15a and 15a' along the support surface 12 and 12' respectively. The base 15 and 15' has a through bore 16 and 16' respectively through each of which extends a respective stationary guide rod 17 and 17'. A coil spring 18 and 18' is held captive about the guide rod 17,17' between a rear wall of the sliding tip clamp and a rear spring stop member 19 and 19'. Accordingly, the sliding tip clamps 13, 13' are biased forwardly.

Figure 2A:
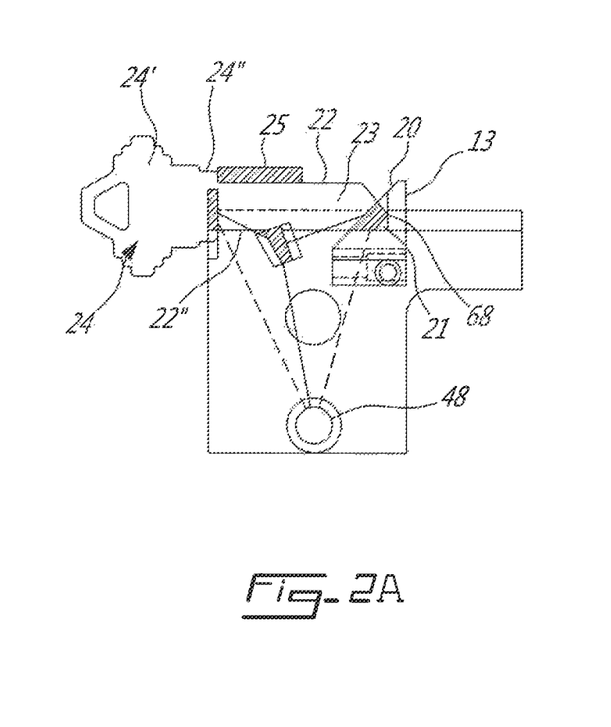
FIGS. 2a and 2b are simplified side views showing a key in clamping position on a flat guide rail support surface of the clamping assembly and illustrating the different clamping points on the key blade and key shoulder by a sliding tip clamp, a pivoting flap clamp and a cam operated side clamp.
Figure 2B:
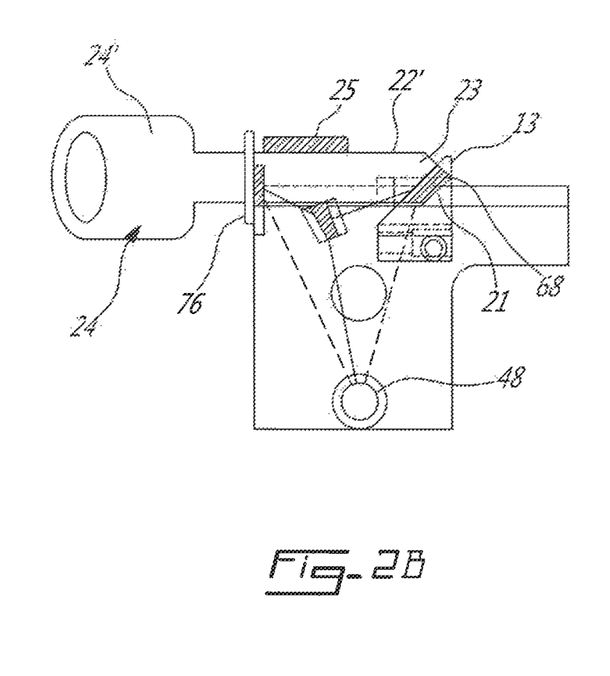
Figure 3A:
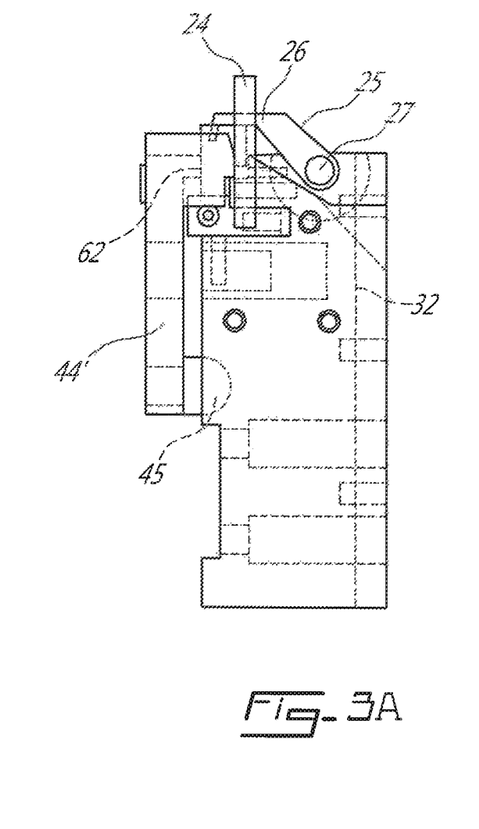
FIGS. 3a and 3b are side views illustrating the position of the flap clamp and cam operated side clamp with respect to a key disposed on the guide rail support surface of the clamping assembly.
Figure 3B:
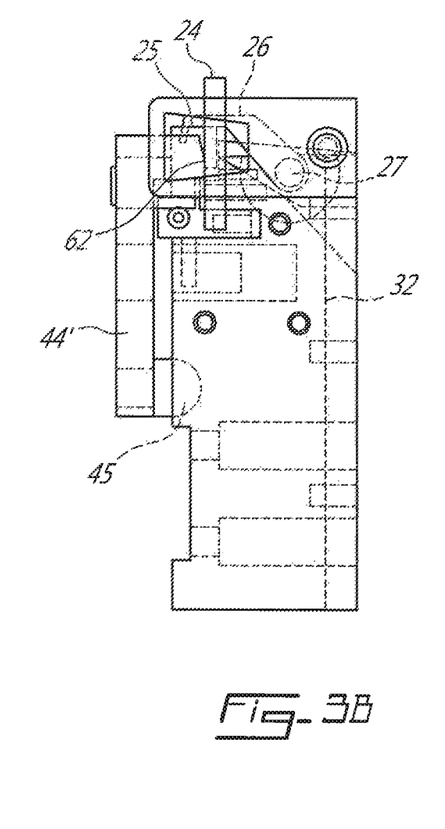

Each sliding tip clamp 13,13' further has an upwardly and rearwardly extending diagonal clamp wall 20 extending from the base 15, 15' and provided for frictional engagement with a key tip lower diagonal portion 21 as shown in FIG. 2. Accordingly, the diagonal clamp wall 20,20', shown in FIGS. 1, 2, 2A and 2B extends away from the top edge 22, 22' of the key and key blank whereby to permit free and unobstructed passage of a stylus or cutter of a key duplicating machine as will be described later.

Referring now more specifically to FIGS. 1 and 5 to 7, there is described the construction and operation of a pivoting flap clamp 25 which is displaceably engageable on a forward portion of the top edge 22, 22' of a respective one of the key blades 23 of the key 24 as illustrated in FIG. 2. This pivoting flap clamp 25 applies a downward force on the key blades 23 to force and hold the bottom edge 22" of the key blade 23 against its respective guide rail support surface 12 and 12' before applying the side clamping forces.

Figure 6:
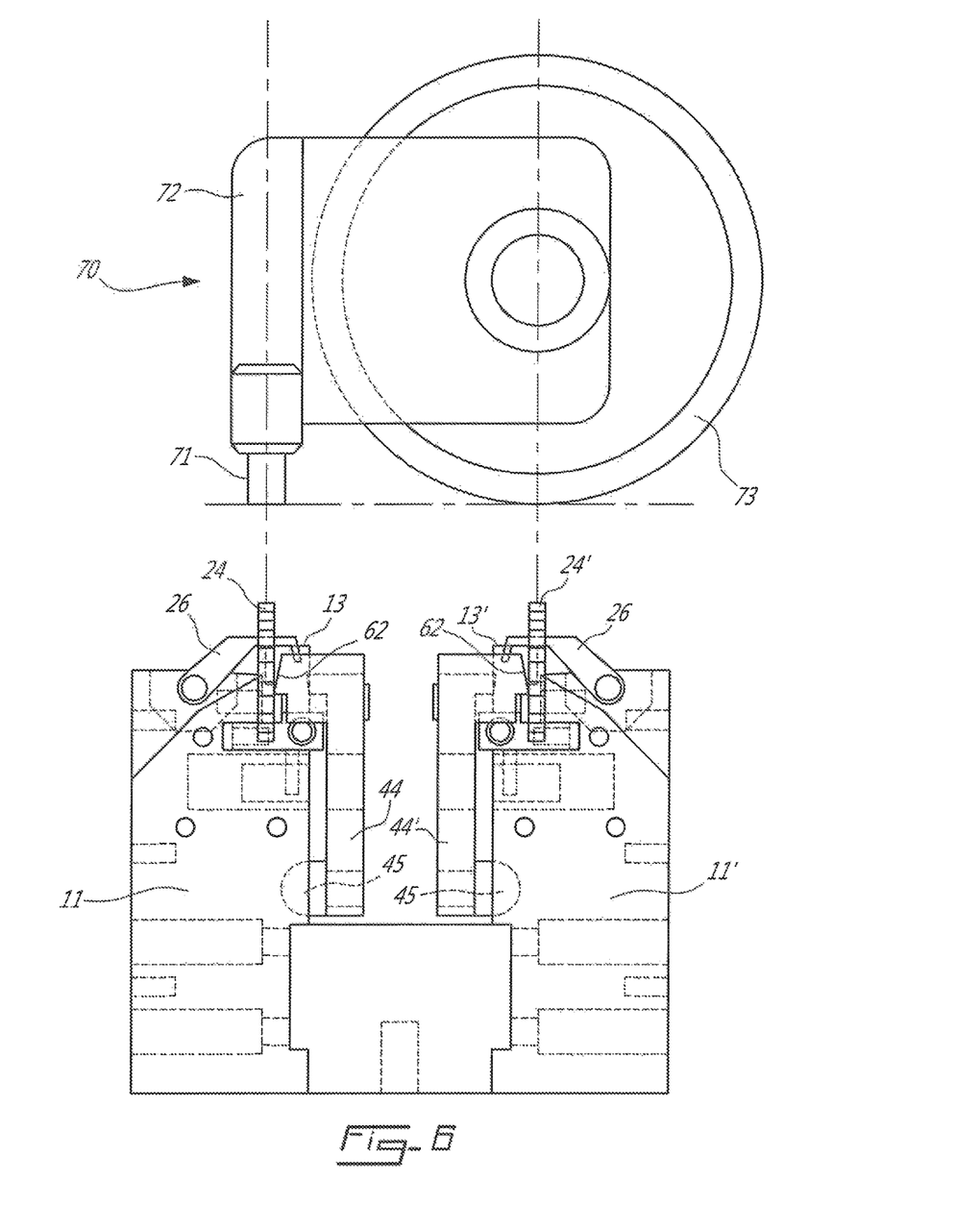
FIG. 6 is another front view partly fragmented showing the disposition of the different clamping elements and the position of the key cutting machine disposed above the clamping assembly.

As shown in FIG. 1, the pivoting clamp 25, only one described, to facilitate the description, is an assembly which comprises of a flap portion 26 which is spring biased in a key blade engagement position, as shown in FIG. 6, namely with the flap portion 26 closed on the top edge 22 of a key. This spring bias is provided through a shaft 27 having a torque mechanism secured thereto. The torque mechanism is comprised by a pinion gear 28 secured to an end of the shaft 27 by an allen screw 29 and in toothed engagement with a rack 30 herein a straight rod rack having a plurality of gear teeth 31 formed in an edge thereof. The rack 30 is guidingly and displaceably retained in a vertical channel 32 formed in the housing cover 11'. A coil spring 33 is held captive in the channel 32 under the rack 30 to urge the rack upwardly. A housing cover 34 is secured over the channel 32 and has a window opening 35 therein through which extends a rack retraction dowel 36 which is secured to the rack to retract the rack against the upward pushing force of the spring 33. Accordingly, with the rack biased upwardly, the pinion gear 28 exerts a rotation or torque on the shaft 27 biasing the flap part of the pivoting flat clamp 25 against the upper edge of the key or key blank.

Figure 7:
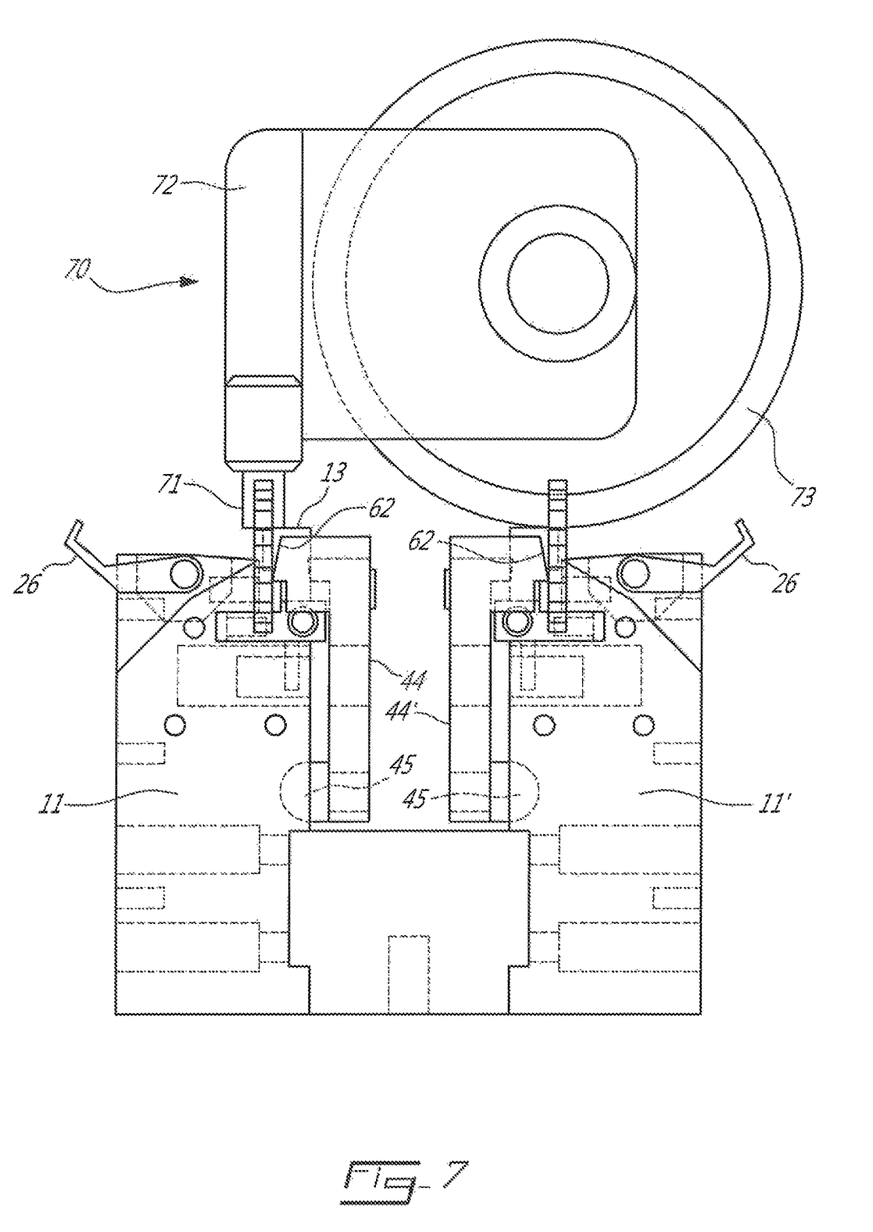
FIG. 7 is a view similar to FIG. 6 but showing the stylus engaged with the bitted portion of the key and the cutler engaged with the top edge of the blank.
Figure 8:
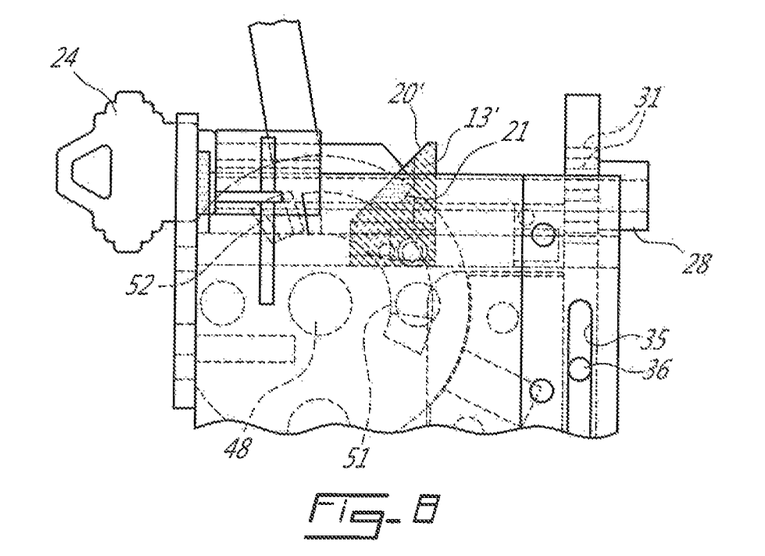
FIG. 8 is an enlarged side view partly fragmented showing the clamping areas on a shoulder stop key jaw with the flap engaged thereover.
Figure 9:
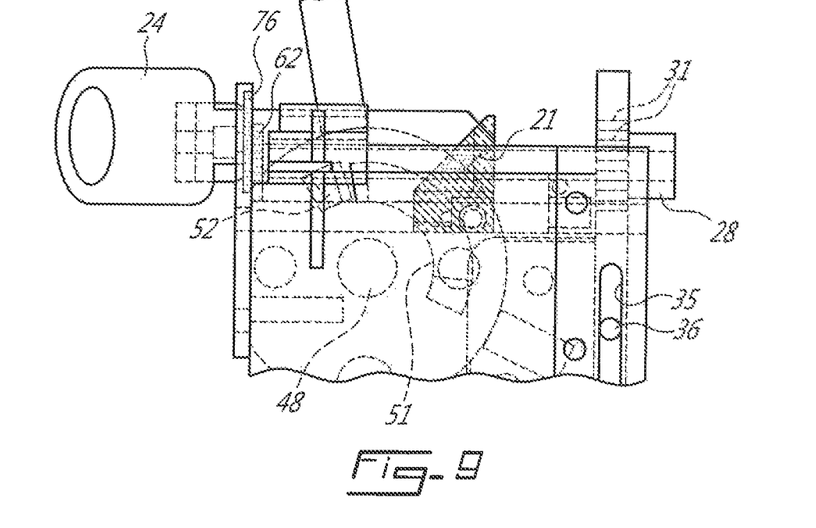
FIG. 9 is a side view similar to FIG. 8 but showing a different type of key secured in the universal clamping assembly of the present invention and wherein the key is a tip-shoulder double-sided key jaw.

As also illustrated and more clearly in FIGS. 1, 6 and 7, a flap lifting member 40 is displaceably secured about the shaft 27 and engages the flap portion 26 of the pivoting flap clamp to retract the flap to remove or insert the shaft of a key or key blank. The dowel 36 also restricts the movement of the flap portion to its engagement and disengagement positions due to the limited displacement of the dowel along the slot 35 with the upper part of the slot limiting the engaged position and the lower and the maximum disengaged position as shown in FIGS. 6 and 7.

In referring again to FIGS. 1, 6 and 7, the universal clamping assembly 10 also comprises a pair of cam operated side clamps 43 for immovably and transversally clamping the key blank and key blades 23 on the flap guide rail support surfaces. The side clamps 43 comprise a pair of side clamping walls 44 and 44' each disposed to a side of a respective one of the flat side rails 12 and 12' and biased to a key disengaged position on a lower pivot connection 45 as better shown in its assembly configuration in FIGS. 6 and 7. These pivots 45 are located in a pivot hole 46, one of which is shown in the housing block 11 (FIG. 1). A disk cam 47 is rotatably displaceable between the pair of side clamping walls 44 and 44' on a cam support shaft 48 which extends through holes 49 in the side clamping walls and into holes 50 in the housing block 11 and housing cover 11', only one hole 50 being shown in FIG. 1.

The disc cam 47 is a circular cam having opposed vertical parallel walls 50 and 50' with each wall having an identical ramp formation 51 disposed thereon and in transverse alignment with one another. These ramp formations 51, only one shown herein, are disposed in alignment with knobs 52 secured to opposed outer side walls 53 of each of the side clamping walls 44 and 44'. The means to cause displacement of the cam 47 on the cam shaft 49 is effected by a lever 55 secured in a hole 56 formed on the circumferential side wall of the disc cam 47 and projecting upwardly forward therefrom. A hand ball 57 is secured at the top of the lever to facilitate engagement thereof by the hand of the user person. Although not shown, the disc cam 47 as a detent in the back of the circumferential portion thereof, and in which a cam detent plunger 58 extends to limit the rotational displacement of the cam. The cam detent plunger 58 is spring biased and its housing is held captive in a cavity 59 formed in a stationary detent housing 60 secured in the clamping assembly.

In operation, when the lever arm 55 is pulled forwardly rotating the disc cam counterclockwise, the ramp formations engage the knobs 52 causing the ramps 51 to apply an outward pushing force against the knobs 52 to impart a pivoting side displacement of the side clamping walls on their lower pivot connections 45 to cause clamping formations herein clamp edge 61 and the clamp finger 62 secured along the upper edge of the clamping walls to be displaced upwardly to apply clamping pressure against at least two space the part locations of the key and key blank respectively, to clampingly retain same against an opposed ramp wall 63 secured to the housing block 11 and housing cover 11'. The ramp walls 63 are spaced at a predetermined distance above the guide rail support surfaces 12 and 12' to clampingly retain the key and the key blank on said rail support surfaces.

As shown in FIG. 1, the sliding tip clamps 13 and 13' are also transversally displaceable on the guide rail surface 12 and 12' against a transverse spring force exerted by a spring 65 located in a cavity 66 of the base 15 and 15' of the sliding tip clamps to urge the clamp in the direction of the side clamps 44 and 44'. The sliding tip clamp further has a vertical abutment wall 67 which projects from an upwardly and rearwardly extending diagonal clamp wall extending from the base. The vertical abutment wall is engaged by one of the clamping formations herein the clamping ridge 61 extending horizontally along the upper end of the clamping walls to apply pressure against a lower and portion of a tip end of the key and key blank as shown in FIG. 2 and identified by reference numeral 68 and against the transverse spring force of the spring 65 to clamp the lower and portion of the key blade 23 against the ramp wall 63. The clamp finger 62 has a flat vertical clamping wall 62' which is disposed for clamping the key and key blank adjacent the shoulder portion of the key head 24' and this location being identified by reference numeral 69 in FIG. 2. Accordingly, the key blade 23 of the key and key blank are clamped in areas which are clear of the bitted upper edge area or the top edge portion 22' of the key blades of the key and key blank. Accordingly, it can be seen that the side clamping walls 44 and 44' when pushed outwardly by the cam produce three point contacts against the key and key blanks namely a contact at the tip of the key and key blanks via the sliding clamp, along the lower edge of the key blade by the cam force exerted through the knobs and at the head portion of the key adjacent the shoulder 24'' of the key.

Figure 4A:
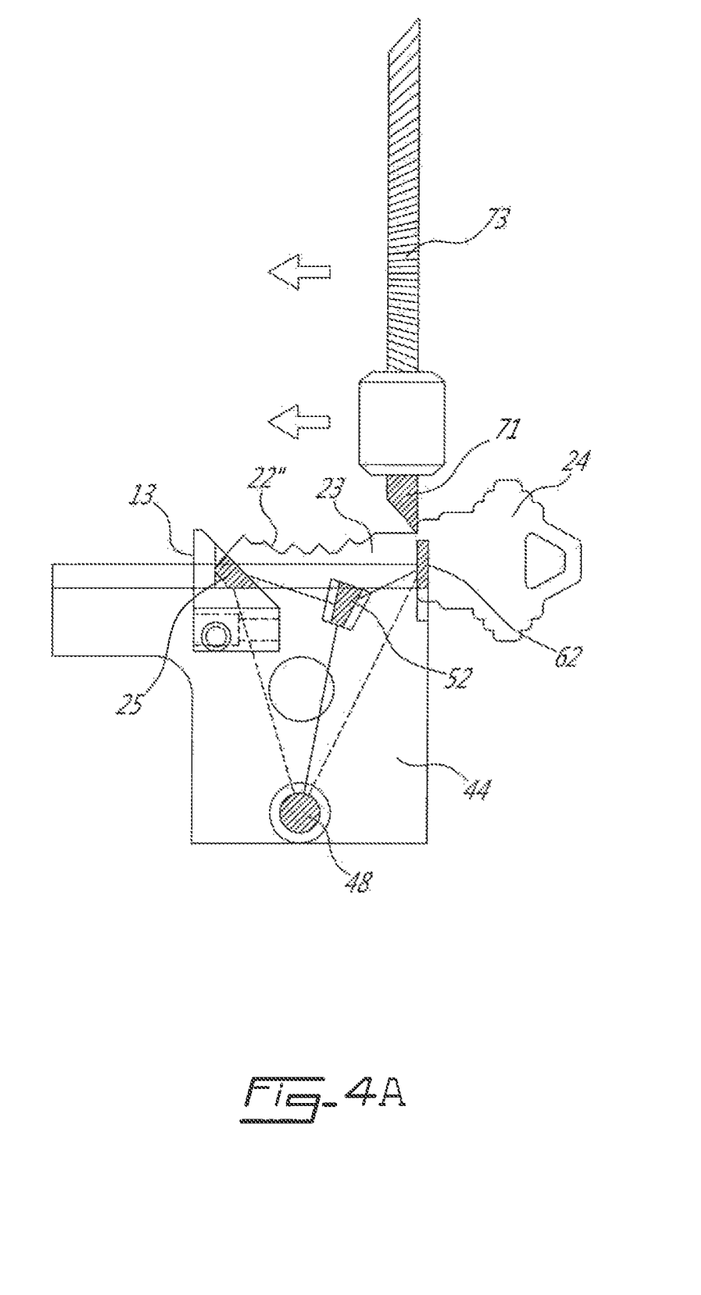
FIG. 4A is a side view showing a key to be duplicated engaged by the universal clamping assembly and wherein a stylus is positioned for displacement along the bitted portion of the key.
Figure 4B:
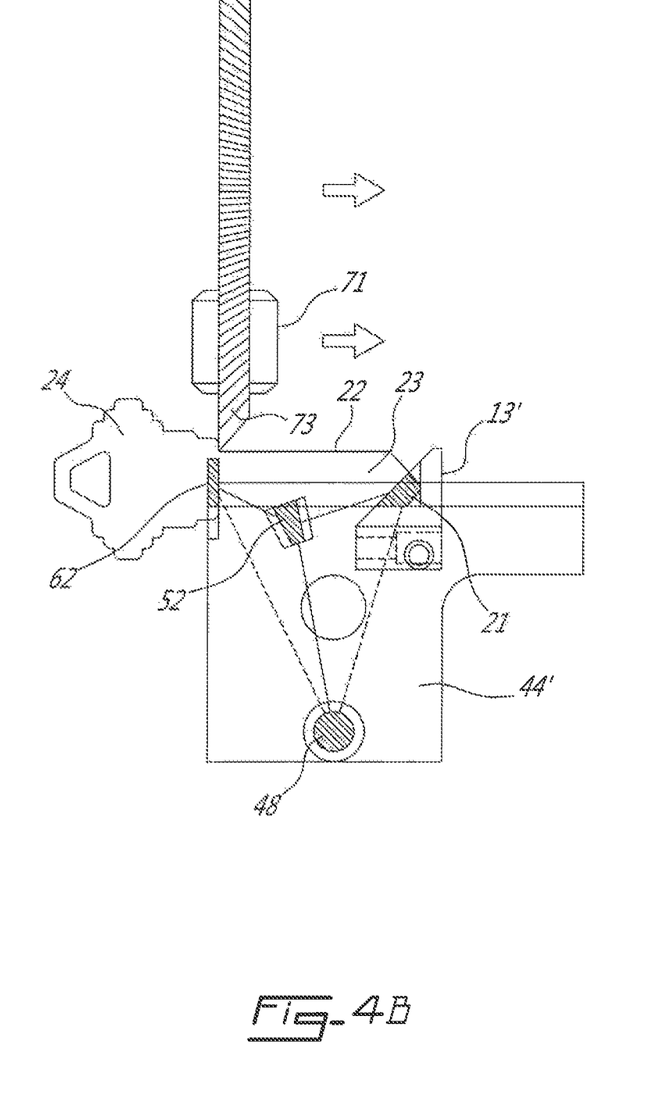
FIG. 4B is a side view similar to FIG. 4A and showing the position of the key cutting machine disposed on the upper edge of the key to be bitted adjacent the shoulder of the key.
Figure 5A:
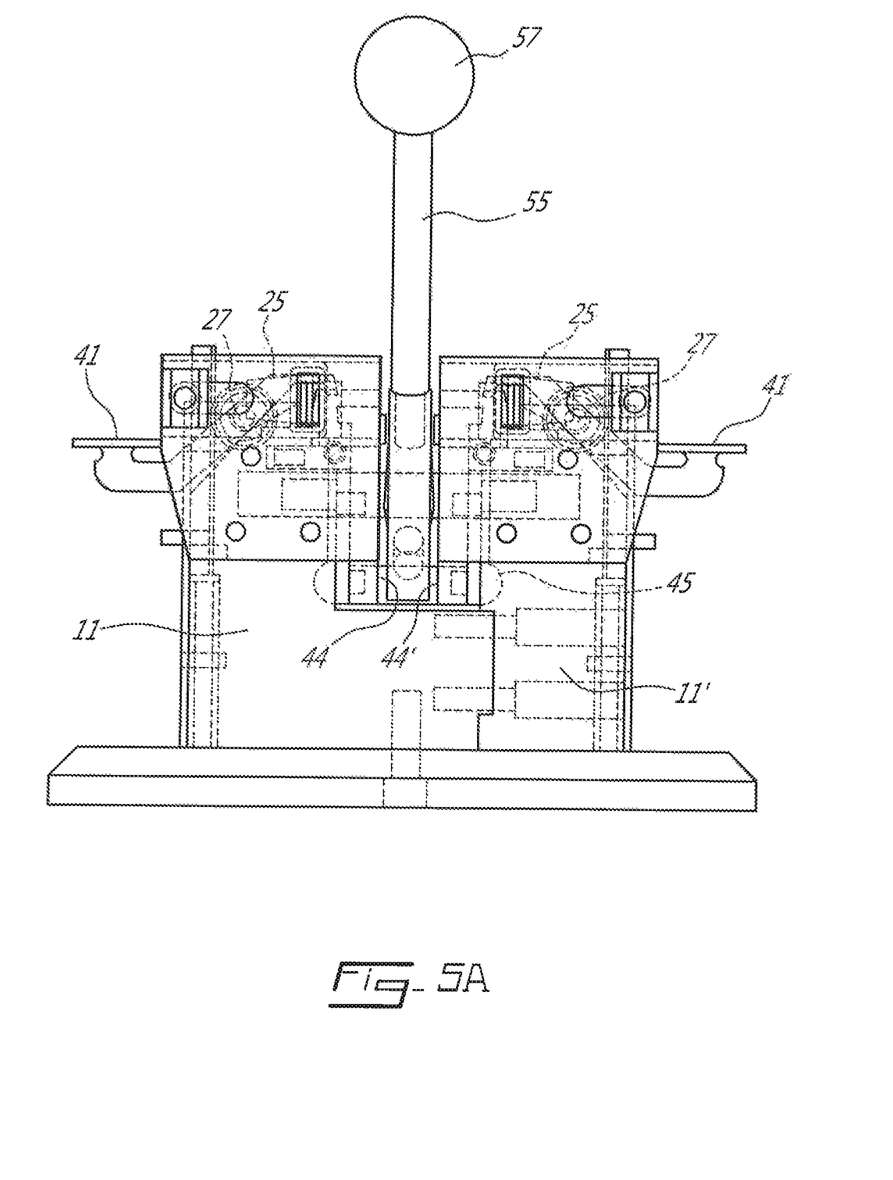
FIG. 5A is a front view of the universal clamping assembly.
Figure 5B:
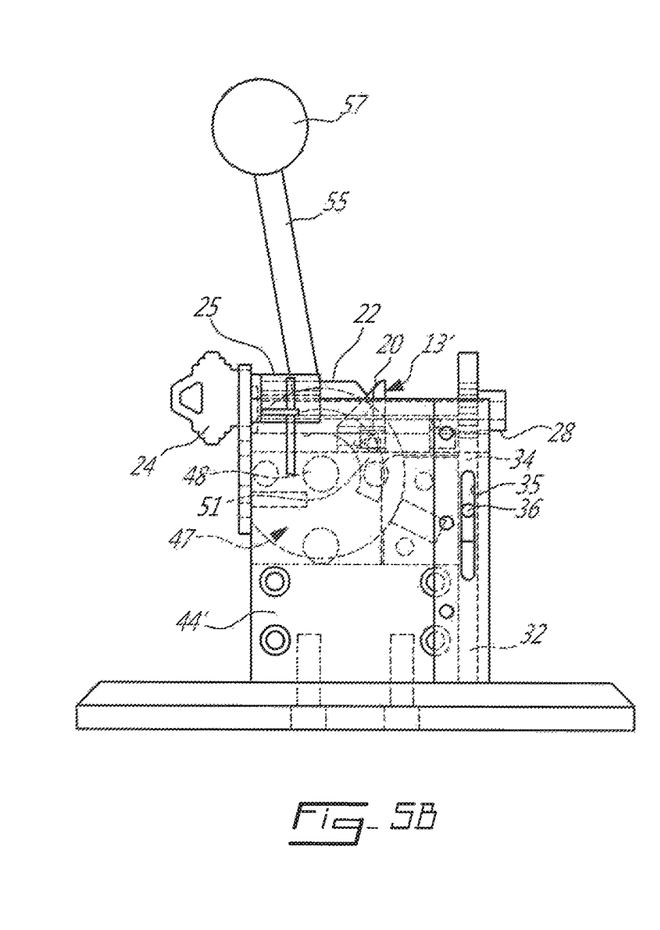
FIGS. 5B and 5C are side views of the universal clamping assembly for clamping a shoulder stop key and a double-sided key, respectively.
Figure 5C:
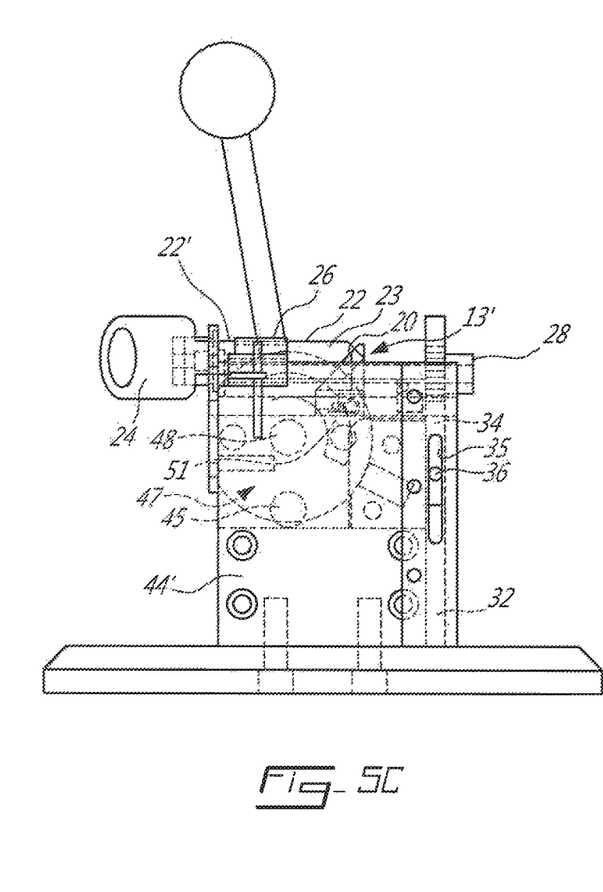

With reference now to FIGS. 4A, 4B, 6 and 7, there will be described briefly the basic elements of the key blank biting assembly 70 which is mounted in an upper part of the universal clamping assembly 10 above the housing 11 and 11'. The key blank biting assembly 70 basically comprises a stylus follower 71 which is secured to a cutter blade support 72 to which is rotatably supported a cutter blade 73 rotatably driven by a motor as is well-known in the art. As shown in FIG. 7, when the stylus and cutter are in a cut position, the flap portions 26 are in an open position, herein at an angle of 135o whereby to clear the displacement of the cutter blade. Also, as previously described, the sliding clamp 13, 13' provides efficient clearing for the blade and this is illustrated in FIGS. 4A and 4B. As shown in FIG. 4A, the stylus is displaced in tandem with the cutter blade with the stylus following the bitted edge 22''' of the key blade 23, as simultaneously the cutter blade cuts a corresponding profile in the top edge 22 of the key blade 23. The key blade and key blank blade are held stationary during this duplicating operation by the three point contacts. As can be appreciated with the universal clamping assembly as above-described, the clamping assembly can accommodate different key and key blank lengths, widths and thicknesses. It is also pointed out that this key cutting process is simple and a user person can operate the machine simply by loading the keys into apertures or slots 76' on the front plates 14 and 14' by firstly lifting the individual flaps by pressing on the flap lifting tab 41. For the shoulder stop key, the front plates have a centering slot 76' in a centering plate 76, unlike that of the double-sided key. The clamping forces activated with the handle or leaver 55 is pulled forwardly. By this motion, the pair of ramps on the cam pushes out on a pair of opposing knobs on the three point clamp plates applying a clamping force against the housing ramp, at the head of the key and one at the tip of the key. The sliding clamp transfers clamping force to the key tip on a diagonal to make clamping contact and clear the cutter blade. The sliding clamp moves with the key tip to accommodate the key blade length as the key blade is inserted onto the guide rail support surface. The side motion of the three point clamps accommodates the different key thicknesses. The rack and pinion assembly serve two purposes. They provide the flap spring force to position the key and rotate the flaps to clear the cutting operation. The flaps also force the key against the rail support surface and act as a stop precisely aligned to ensure equal depth. It also prevents the key from moving out of position.

It is pointed out that with the tip-shoulder double-sided key that the flaps perform three functions. One is to align the key tip with the pocket wall on the sliding clamp, the second is to apply some friction until the head centering tabs can be activated, and thirdly it provides a stop for the shoulder stop keys. These keys are suspended above the guide rail support surfaces and maintain a common center line between the tip and head side blade. The jaw will clamp all the thicknesses of these key blades.

Briefly, summarizing the method of clamping the key and the key blank, the method comprises firstly inserting a key to be duplicated and a key blank onto a respective one of two opposed flat guide rail support surfaces through a window slots of the key duplicating machine using the universal clamping assembly of the present invention. This is accomplished by lifting the pivoting spring biased clamp and pushing a tip of the key and key blank against a spring force of a respective sliding tip clamp guidingly displaceable along at least a portion of the guide rail support surfaces. As this is being done, the spring biased clamp is released to engage and apply a downward spring force on a forward top edge portion of a respective one of the key blades of the key and key blank to force a bottom edge of the blade against its respective guide rail support surface. A cam element is then operated by pulling on a cam activating arm to displace a pair of side clamping members for immovably and transversally clamping the key blades at two distinct spaced-apart side locations. The tip clamp constitutes a third clamping location.

When the key blade is inserted into the clamping assembly through the window slot 76 formed in the front plates 14,14' of the assembly and the tip of the key blade is pushed against an upwardly and rearwardly extending diagonal clamp wall 20,20' of the sliding clamp for engagement with a lower diagonal portion of the tip of the key blade to accommodate a key cutter or a stylus to be engaged with the top edge of the blades. Also, when the cam element is displaced on its pivot rod, opposed ramp formations formed on the opposed side walls of the cam element, are displaced in sliding contact with knobs secured in each of the side clamping members and these ramps apply an outward pushing force against the clamping members to cause clamping formations of the clamping members to apply a clamping pressure against the spaced-apart locations on the key blade and this being done simultaneously.

Figure 10:
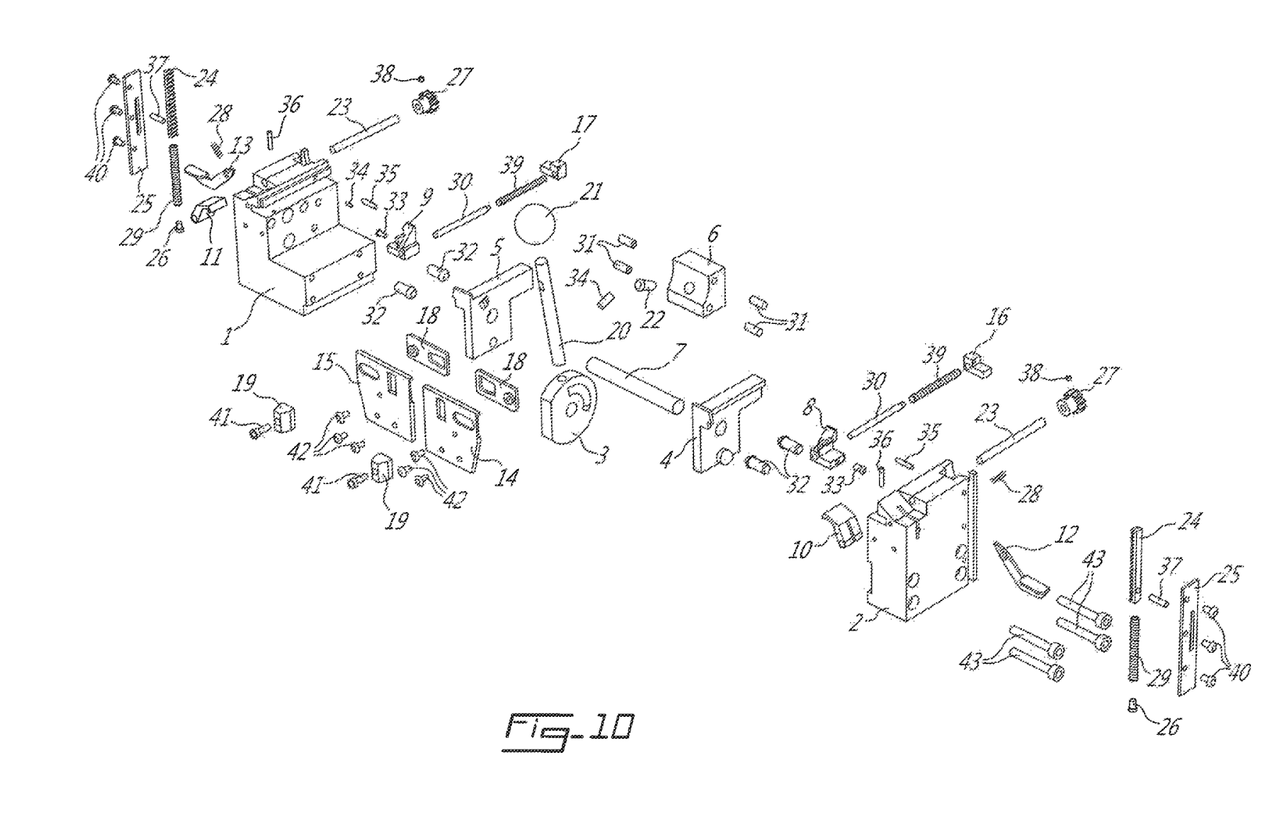
FIG. 10 is an exploded view similar to FIG. 1 and identifying the parts thereof with respect to parts list No. 1 for a double-sided key.

The following parts lists refer to FIG. 10 which is an exploded view of the clamping assembly for a double-sided key illustrating the slight difference from the assembly of FIG. 1 for the shoulder stop key. The difference resides in the front plate assembly.

It is within the ambit of the first invention to provide any obvious modifications of the preferred embodiment Universal Jaw Components (Double Sided)—Parts List No. See FIG. 11)

| | | |
|---|---|---|
| 1 | Housing | |
| 2 | Housing Cover | |
| 3 | Cam | |
| 4 | Right Stationary Clamp | |
| 5 | Left Stationary Clamp | |
| 6 | Cam Detent Housing | |
| 7 | Cam Pivot Shaft | |
| 8 | Right Tip Clamp | |
| 9 | Left Tip Clamp | |
| 10 | Right Flap | |
| 11 | Left Flap | |
| 12 | Right Flap Lifting Tab | |
| 13 | Left Flap Lifting Tab | |
| 14 | Right Window Plate | |
| 15 | Left Window Plate | |
| 16 | Right Spring Stop | |
| 17 | Left Spring Stop | |
| 18 | Centering Plate | 2 pieces |
| 19 | Centering Plate Tab | 2 pieces |
| 20 | Lever Shaft | |
| 21 | Lever Ball | |
| 22 | Cam Detent Spring Plunger | |
| 23 | Flap Shaft | 2 pieces |
| 24 | Flap Activation Rack | 2 pieces |
| 25 | Rack Cover Plate | 2 Pieces |
| 26 | Rack Spring Cap | 2 Pieces |
| 27 | Rack Pinion | 2 Pieces |
| 28 | Flap Lifting Tab Spring | 2 Pieces |
| 29 | Flap/Rack Spring | 2 Pieces |
| 30 | Spring Guide | 2 Pieces |
| 31 | Cam Detent Housing Dowel Pins | 4 Pieces |
| 32 | Stationary Clamp Spring Plunger | 4 Pieces |
| 33 | Tip Clamp Spring Plunger | 2 Pieces |
| 34 | Cam Stop Dowel | |
| 35 | Spring Stop Dowel | 2 Pieces |
| 36 | Front Tip Stop Clamp Dowel | 2 Pieces |
| 37 | Rack Activation Dowel | 2 Pieces |
| 38 | Pinion Set Screw | 2 Pieces |
| 39 | Tip Clamp Spring | 2 Pieces |
| 40 | Rack Cover Plate Screws | 6 Pieces |
| 41 | Centering Plate Screw | 2 Pieces |
| 42 | Window Plate Screws | 6 Pieces |

What is claimed is:

1. A method of clamping a key to be duplicated and a key blank in a key duplicating machine, the method comprising the steps of:
   (i) inserting a blade of the key to be duplicated onto a first of two opposed flat guide rail support surfaces of the key duplicating machine through a respective key orifice by lifting a first pivoting spring biased clamp and pushing a tip of the key to be duplicated against a spring force of a first sliding tip clamp, which is guidingly displaceable along at least a portion of said first of two opposed flat guide rail support surfaces,
   (ii) releasing said first pivoting spring biased clamp to engage and apply a downward spring force on a top edge of the blade of said key to be duplicated so as to force a bottom edge of said blade of said key to be duplicated against the first of two opposed flat guide rail support surfaces,
   (iii) inserting a blade of the key blank onto a second of two opposed flat guide rail support surfaces of the key duplicating machine through a respective key orifice by lifting a second pivoting spring biased clamp and pushing a tip of the key blank against a spring force of a second sliding tip clamp, which is guidingly displaceable along at least a portion of said second of two opposed flat guide rail support surfaces,
   (iv) releasing said second pivoting spring biased clamp to engage and apply a downward spring force on a top edge of the blade of said key blank so as to force a bottom edge of said blade of said key blank against the second of two opposed flat guide rail support surfaces, and
   (v) operating a cam element to displace a pair of side clamps, wherein upon engagement of the respective blade of each of the key to be duplicated and the key blank with a corresponding one of the pair of side clamps, said respective blades become immovably and transversely clamped at three distinct spaced-apart locations.

2. The method as claimed in claim 1, wherein
said step (i) further comprises pushing said tip of said blade of said key to be duplicated against an upwardly and rearwardly extending diagonal clamp wall of said first sliding tin clamp for engagement with a lower diagonal portion of said tip of said blade of said key to be duplicated so as to accommodate a stylus that is to be engaged with said top edge of said blade of said key to be duplicated, and
said step (iii) further comprises pushing said tip of said blade of said key blank against an upwardly and rearwardly extending diagonal clamp wall of said second sliding tip clamp for engagement with a lower diagonal portion of said tip of said blade of said key blank so as to accommodate a key cutter that is to be engaged with said top edge of said blade of said key blank.

3. The method as claimed in claim 1, wherein
said step (iii) further comprises displacing said cam element on a pivot axis, said cam element being a disc cam having identical ramp formations on opposed vertical walls thereof, each of said ramp formations being in sliding contact with a respective nub secured to each side clamp of said pair of side clamps, said ramp formations applying a pushing force against said pair of side clamps so as to cause clamping formations of said pair of side clamps to simultaneously apply a clamping pressure against the blade of the key to be duplicated and the blade of the key blank.

* * * * *

UNITED STATES PATENT AND TRADEMARK OFFICE
CERTIFICATE OF CORRECTION

PATENT NO. : 10,265,783 B2
APPLICATION NO. : 15/412960
DATED : April 23, 2019
INVENTOR(S) : Herman Cox Page 1 of 1

It is certified that error appears in the above-identified patent and that said Letters Patent is hereby corrected as shown below:

In the Specification

At Column 7, Line number 5, delete "List No." and replace with --List No. 1--.

In the Claims

At Column 8, Claim number 2, Line number 31, delete "tin" and replace with --tip--.

Signed and Sealed this
Eighteenth Day of June, 2019

Andrei Iancu
*Director of the United States Patent and Trademark Office*